United States Patent
Ranns et al.

(10) Patent No.: US 10,917,360 B2
(45) Date of Patent: *Feb. 9, 2021

(54) FAST FAIL-OVER USING TUNNELS

(71) Applicant: Cisco Technology, Inc., San Jose, CA (US)

(72) Inventors: Neale D. R. Ranns, Basingstoke (GB); Ijsbrand Wijnands, Leuven (BE); Gregory J. Shepherd, Eugene, OR (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/422,449

(22) Filed: May 24, 2019

(65) Prior Publication Data

US 2019/0280988 A1    Sep. 12, 2019

Related U.S. Application Data

(63) Continuation of application No. 15/797,485, filed on Oct. 30, 2017, now Pat. No. 10,305,818, which is a
(Continued)

(51) Int. Cl.
*H04L 12/911*    (2013.01)
*H04L 12/703*    (2013.01)

(52) U.S. Cl.
CPC ............ *H04L 47/825* (2013.01); *H04L 45/28* (2013.01)

(58) Field of Classification Search
CPC ... H04L 12/911; H04L 12/703; H04L 47/825; H04L 45/28
See application file for complete search history.

(56) References Cited

U.S. PATENT DOCUMENTS 7,826,348 B2    11/2010    Farinacci ............... 370/228
7,969,898 B1    6/2011    Raj ....................... 370/248
(Continued)

FOREIGN PATENT DOCUMENTS

| CN | 101669105 | 8/2012 | |
|---|---|---|---|
| EP | 2140363 | 11/2011 | H04L 12/18 |
| WO | WO 2008/134292 | 11/2008 | G06F 15/16 |

OTHER PUBLICATIONS

Cisco; "Configuring IPv4 Multicast Layer 3 Switching," Cisco IOS Software Configuration Guide, Release 12.2SX, Chapter 37, pp. 1-30.
(Continued)

*Primary Examiner* — Chi Ho A Lee
(74) *Attorney, Agent, or Firm* — Campbell Stephenson LLP

(57) ABSTRACT

Various systems and methods for performing fast fail-over. One method involves electing a first node as a designated forwarder node and electing a second node as a backup designated forwarder node. Prior to detecting a loss of connectivity between the designated forwarder node and the local network, the method elects both the designated forwarder node and the backup designated forwarder node, and the designated forwarder node forwards to a core network at least a first packet received from a local network. Subsequent to detecting a loss of connectivity, using the backup designated forwarder node to forward an instance of a second packet to the core network. In one embodiment, the backup designated forwarder node forwards an instance of the second packet, via a tunnel, to the designated forwarder node, which then forwards the instance of the second packet to the core network following the loss of connectivity.

20 Claims, 11 Drawing Sheets

Related U.S. Application Data continuation of application No. 14/932,016, filed on Nov. 4, 2015, now Pat. No. 9,853,915.

(56) References Cited

U.S. PATENT DOCUMENTS

| | | | |
|---|---|---|---|
| 8,589,573 B2 | 11/2013 | Mirtorabi | 709/230 |
| 8,792,501 B1* | 7/2014 | Rustagi | H04L 45/58 |
| | | | 370/395.53 |
| 2006/0018333 A1 | 1/2006 | Windisch | 370/432 |
| 2006/0031490 A1 | 2/2006 | Provine | 709/225 |
| 2007/0174483 A1 | 7/2007 | Raj | 709/238 |
| 2012/0201124 A1 | 8/2012 | Marques | 370/221 |
| 2012/0219004 A1 | 8/2012 | Balus | 370/395.53 |
| 2013/0089100 A1 | 4/2013 | Zhao | 370/393.5 |
| 2014/0029622 A1* | 1/2014 | Bettink | H04L 47/10 |
| | | | 370/394 |
| 2015/0078378 A1 | 3/2015 | Wijnands | 370/390 |
| 2015/0256405 A1 | 9/2015 | Janardhanan | 370/255 |
| 2016/0119156 A1 | 4/2016 | Drake | 709/223 |
| 2016/0134518 A1 | 5/2016 | Callon | 370/390 |
| 2016/0134525 A1 | 5/2016 | Zhang | 370/392 |
| 2016/0277210 A1 | 9/2016 | Lin | |
| 2017/0063600 A1 | 3/2017 | Singh | |

OTHER PUBLICATIONS

Cisco; "Configuring Bidirectional PIM," Cisco IOS IP Configuration Guide, Release 12.2, pp. 1-6.

Deering, Stephen E., et al., Stanford University, "Multicast Routing in Datagram Internetworks and Extended LANS," pp. 85-110.

Karan, A., et al., Cisco Systems, Inc., "Multicast Only Fast Re-Route," draft-ietf-rtgwg-mofrr-08, May 18, 2015, pp. 1-14.

Mohanty, S., et al., Cisco Systems, Inc., "A New Designated Forwarder Election for the EVPN," draft-mohanty-bess-evpn-df-election-00, Mar. 7, 2015, pp. 1-11.

Bashandy, Ed. A., et al., Cisco Systems, Inc., "BGP Prefix Independent Convergence," draft-rtgwg-bgp-pic-02.txt, Oct. 21, 2013, pp. 1-20.

Li, T., et al., Juniper Networks, "Cisco Hot Standby Router Protocol (HSRP)," Network Working Group, Request for Comments 2281, Mar. 1998, pp. 1-17.

Moy, J., Ascend Communications, Inc., "OSPF Version 2," Network Working Group, Request for Comments 2328, Apr. 1998, pp. 1-244.

Handley, M., et al., UCL, "Bidirectional Protocol Independent Multicast (BIRDIR-PIM)," Network Working Group, Request for Comments 5015, Oct. 2007, pp. 1-43.

Filsfils, Ed. C., et al., Cisco Systems, Inc., "Loop-Free Alternate (LFA) Applicability in Service Provider (SP) Networks," Internet Engineering Task Force (IETF), Request for Comments 6571, Jun. 2012, pp. 1-35.

Sajassi, Ed. A., et al., Cisco Systems, Inc., "BGP MPLS-Based Ethernet VPN," Internet Engineering Task Force (IETF), Request for Comments 7432, Feb. 2015, pp. 1-56.

Bryant, S., et al., Cisco Systems, Inc., "Remote Loop-Free Alternate (LFA) Fast Reroute (FRR)," Internet Engineering Task Force (IETF), Request for Comments 7490, Apr. 2015, pp. 1-29.

Holbrook, Hugh W., et al., Department of Computer Science, Stanford University, "IP Multicast Channels: Express Support for Large-Scale Single-Source Applications," SIGCOMM, 1999, pp. 65-78.

Breitgand, David, et al., "Hierarchical Reactive Monitoring of Multicast Membership Size," pp. 1-15.

* cited by examiner

| Incoming Interface | Action |
|---|---|
| Core | Drop |
| Tunnel | Forward to LAN |
| LAN | Forward to Tunnel |

| Incoming Interface | Action |
|---|---|
| Core | Forward to LAN |
| LAN | Forward to core |
| Tunnel | Drop |

| Incoming Interface | Action |
|---|---|
| Core | Forward to tunnel |
| LAN | Drop |
| Tunnel | Forward to core |

FAST FAIL-OVER USING TUNNELS

CROSS-REFERENCE TO RELATED APPLICATIONS

The present patent application is a continuation of U.S. patent application Ser. No. 15/797,485, filed on Oct. 30, 2017, entitled "Fast Fail-Over Using Tunnels," which is expected to issue as U.S. Pat. No. 10,305,818, and which is a continuation of U.S. patent application Ser. No. 14/932, 016, filed on Nov. 4, 2015, entitled "Fast Fail-Over Using Tunnels," which has since issued as U.S. Pat. No. 9,853,915. Both are incorporated by reference herein in entirety and for all purposes as if completely and fully set forth herein.

BACKGROUND OF THE INVENTION

Network nodes forward data. Network nodes may take form in one or more routers, one or more bridges, one or more switches, one or more servers, or any other suitable communications processing device. The data is commonly formatted as packets and forwarded using forwarding tables. A packet is a formatted unit of data that typically contains control information and payload data. Control information may include: information that identifies sources and destinations, such as addresses, error detection codes like checksums, sequencing information, etc. Control information is typically found in packet headers and trailers. Payload data is typically located between the packet headers and trailers.

Forwarding packets involves various processes that, while simple in concept, can be complex. The processes involved in forwarding packets vary, depending on the type of forwarding method used. In some networks, the potential exists for packet looping and delivery of duplicate copies of packets to receivers. Packet looping and the unnecessary delivery of duplicate copies of packets represent unwelcome burdens on network performance. Another potential issue networks is packet loss. For example, during periods of network reconfiguration, it is possible that packets are dropped and that data thus fails to reach receivers. Preventing or minimizing packet loss is an important aspect of network design.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
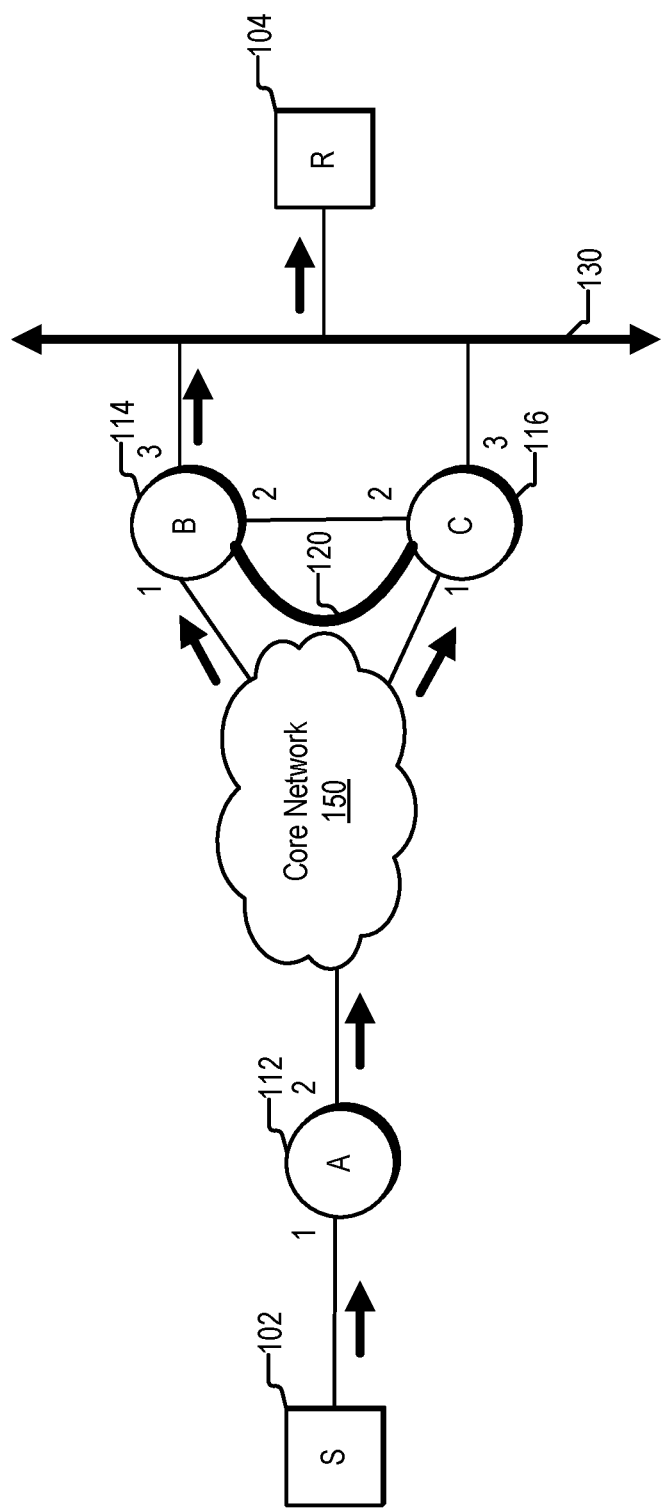
FIG. 1 is a simplified block diagram illustrating certain components of an example network.

Various systems and methods for performing fast fail-over. For example, one method involves receiving a packet at a node. The packet is received at the node in response to a designated forwarder (DF) detecting loss of communication between the DF and a receiver node. The method also involves determining that the first packet was received via a tunnel. The method also involves forwarding the first packet and initiating a DF election. Forwarding the first packet and initiating the DF election are performed in response to determining that the first packet was received via the tunnel.

Multicast

Multicast delivers multicast data packets (data packets that traditionally include destination address information that identifies a multicast group, such as a multicast group address) from a source to multiple receivers without unduly burdening the source. As used herein, the term "receiver" signifies a host (such as a computing device or application) that has subscribed to a multicast group. Instead of the source replicating a multicast data packet and sending a copy of the multicast data packet to each receiver, the source sends a single copy of a multicast data packet into a multicast network. A multicast network is a network that includes multicast-enabled routers (referred to herein as multicast-enabled nodes or simply as nodes). The multicast-enabled nodes replicate the packet at the point(s) where paths to various receivers diverge. Multicast routing protocols enable multicast transmission (i.e., one-to-many connections and many-to-many connections) by replicating a multicast data packet close to the destination of that multicast data packet, thus avoiding the use of multiple unicast connections for the same purpose. This saves network bandwidth and improves throughput.

A multicast-enabled node uses forwarding tables maintained by the multicast-enabled node to determine which of the multicast-enabled node's interfaces (if any) a multicast data packet should be forwarded to. The multicast-enabled node can then replicate the multicast data packet as needed and transmit the replicated multicast data packets via the determined interface(s).

A number of multicast protocols exist. Many traditional multicast protocols involve building multicast distribution trees (MDTs) and maintaining per-group forwarding state information at each node in a multicast network. Another protocol is known as Bit Indexed Explicit Replication (BIER), sometimes also referred to a stateless multicast. BIER-enabled networks implement multicast without generating and maintaining much of the state information used in traditional multicast.

If a receiver wants to receive multicast data packets from a given source or associated with a given multicast group address, the receiver subscribes to, or joins, the multicast group. This involves the receiver sending a join message indicating the receiver's interest in the multicast group (or source). The join message can be, for example, an Internet Group Management Protocol (IGMP) membership report or a multicast listener discovery (MLD) report that contains information, such as a multicast group address, identifying the multicast group in which the receiver is interested. While group address is used here for the sake of brevity, it should be understood that the receiver can send a join message with information (such as a source address) identifying a particular source from which the receiver wishes to receive multicast data packets in addition to or as an alternative to information identifying a particular multicast group.

Information indicating the receiver's interest in a multicast group is propagated towards a source that transmits multicast data packets to the multicast group's members. There may be multiple sources for a given multicast group, and the join information is, in one embodiment, propagated towards the closest source, where the distance to a given source is measured in terms of number of hops, delay, or any other routing metric. For example, a multicast-enabled node that receives an IGMP membership report converts the IGMP membership report into a protocol independent multicast (PIM) join message and forwards the PIM-Join message towards a source of multicast traffic. Traditional multicast protocols use reverse path forwarding checks (RPFs) and build MDTs. This typically involves forwarding the PIM-Join message hop-by-hop through a multicast network towards the source. Each node along the path by which the PIM-Join is forwarded updates its forwarding information to indicate that if the node receives multicast data packets for the multicast group identified in the PIM-Join, the node should forward those multicast data packets towards the receiver, e.g., out the interface via which the PIM-Join message was received. In contrast to traditional multicast, BIER uses an overlay signaling mechanism, such as border gateway protocol (BGP), to forward join information toward the source. A BIER edge node, known as an egress router, forwards the join information to another BIER edge node, known as an ingress router. The ingress router updates its state information such that packets for the specified groups are forwarded by the ingress router through the multicast network towards the egress router that sent the join information.

The receiver sends the join message to one or more multicast-enabled nodes, such as provider edge (PE) nodes, to which the receiver is coupled. In one embodiment, the receiver's connection to the multicast-enabled nodes is indirect. For example, the receiver can send the join message to a local area network (LAN) to which the receiver and one or more multicast-enabled nodes are connected. Each multicast-enabled node coupled to the LAN propagates the join message towards the source. This results in each of the multicast-enabled nodes on the LAN receiving packets for the multicast group the receiver joined. If each of the multicast-enabled nodes forwards the packets to the receiver (e.g., onto the LAN), the receiver receives duplicate packets, which unnecessarily consumes network bandwidth and processing resources.

Designated Forwarders

In certain network environments that include redundant nodes, e.g., multiple multicast-enabled nodes, the nodes designate one of the nodes to forward packets. Those nodes not so designated are prevented from forwarding packets. Doing so prevents transmission of duplicate copies of packets to receivers, and can also prevent packets from looping. For example, if two nodes are both coupled to a LAN, and are both configured to forward packets for a particular destination, e.g., receiver or receivers that have joined a particular multicast group, the two nodes can agree that only one of the nodes should forward packets associated with the multicast group onto the LAN. The process by which the two nodes agree on which of the two nodes will forward packets onto the LAN is known as a designated forwarder election. The elected node is known as a designated forwarder (DF). The DF forwards traffic destined for the receiver (e.g., packets addressed to the multicast group (or from the source)) to which the receiver has subscribed. Nodes that are not elected DF do not forward traffic to the receiver. For example, a non-DF that receives multicast traffic that it would otherwise forward to the receiver, e.g., traffic that includes packets associated with a group the receiver has joined, drops the packets instead of forwarding them.

Electing one node as DF helps to reduce redundant traffic. However, if the DF becomes unable to forward traffic, traffic can be lost since none of the other nodes are configured to forward traffic. Packets are dropped and fail to reach the receivers until after the DF's inability to forward traffic is detected and another node is elected as DF. The process of detecting a failed DF and electing a new DF to replace the failed DF is referred to as fail-over. The fail-over process is often relatively slow, and while ongoing, significant numbers of packets can be dropped. There are various mechanisms to reduce the amount of time taken to perform fail-over processes. For example, unicast routing protocols sometimes employ prefix independent convergence (PIC) or loop-free alternate (LFA) routes. The options for fast fail-over in multicast networks are more limited and often increase network traffic and complexity.

One mechanism that can reduce the amount of time taken for fail-over of a DF is to elect a backup designated forwarder (BDF) at the same time the DF is elected. The BDF can step in and become the acting DF in case a failure affects the DF's ability to forward traffic. Implementing a BDF can reduce the time taken to resume forwarding traffic in case of a failure of the DF, and can thus reduce the amount of dropped traffic. However, some traffic may still be dropped because it takes time for the BDF to detect the failure of the DF and to subsequently send messages announcing itself (e.g., by flooding link state advertisements (LSAs)) as the new DF to the other nodes.

Fast Fail-Over Using Tunnels

Described herein is a fast fail-over mechanism for network configurations that include two or more redundant nodes, where redundant refers to multiple nodes configured to forward traffic to the same downstream entity, such as receiver, LAN, node, customer edge equipment, or the like. Implementing fast fail-over, as described herein, involves setting up a tunnel or shunt link between a first node (e.g., a DF) and a second node (e.g., a BDF), where both the DF and BDF are connected to one or more receivers (e.g., via a shared LAN). If the DF loses connectivity to the LAN, the DF and BDF use the tunnel to transmit traffic to and from the LAN. The DF and BDF can both be configured in advance to properly forward traffic via the tunnel. Thus, the transition to using the tunnel is essentially seamless, and traffic forwarding is resumed without delay as soon as the loss of connectivity is detected. That is, traffic is forwarded to the LAN without interruption caused by updating forwarding state information in the DF or BDF, or reconfiguring any of the nodes in the network. Also, detecting the loss of connectivity is performed by the DF itself. Thus, traffic is resumed via the BDF without communicating with or waiting for intervention from any other network elements. This tends to be faster than fail-over in scenarios in which the BDF (or some other element) is relied on to detect failure and provide notification or complete fail-over procedures.

FIG. 1 is a simplified block diagram of a network 100. Network 100 includes nodes 112, 114, and 116, which are coupled to one another via core network 150 and also to source 102 and receiver 104. As shown in FIG. 1, nodes 114 and 116 are coupled to one another via a tunnel 120 and to receiver 104 via LAN 130. As shown in FIG. 1, packets are sent from source 102 to node 112, and from node 112 into core network 150. The packets are replicated in core network 150 such that copies of the packets are forwarded to nodes 114 and 116. In network 100, and other network environments that include multiple nodes forwarding packets to one or more receivers, redundant copies of packets and looping can occur. Consider an example in which node 114 receives a packet from core network 150 and forwards the packet onto LAN 130. If node 116 receives the packet from LAN 130 and forwards the packet to node 114, e.g., via core network 150, a loop occurs. And if node 116 receives a replicated copy of the packet from core network 150 and forwards replicated copy of the packet onto LAN 130 duplicate copies are received by receiver 104. Further, another loop can occur if node 114 receives the replicated copy of the packet from LAN 130 and forwards the replicated copy of the packet to node 116. This can be prevented by configuring node 114 to forward the packets to receiver 104, while node 116, on the other hand, is configured to drop the packets. This avoids redundant packets from being sent to receiver 104 and prevents packets from looping.

In one embodiment, network 100 is configured to perform multicast data transmission. Nodes 112, 114, and 116 are, in one embodiment, multicast-enabled nodes. These nodes can implement one or more traditional multicast protocols, such as bidirectional protocol independent multicast (bidir-PIM), sparse mode, source specific mode, or the like, or can implement BIER. Multicast-enabled nodes 112-116 are coupled to each other through core network 150 which, in one embodiment, includes a multicast network, or a network that includes a number of multicast-enabled nodes.

Nodes 112-116 are configured as edge nodes, such as provider edge nodes. Each of the nodes 112-116 has interfaces that are identified as shown. For example, node 114 has three interfaces designated 1-3, respectively. These interfaces are used in forwarding information, such as forwarding tables, to determine where a packet should be forwarded. Node 112 is coupled to source 102. Such coupling can be direct (e.g., via a wire, fiber optic cable, wireless connection, or some other communications medium) or indirect (e.g., via a L2 network device or another node, such as a customer edge (CE) node). Nodes 114 and 116 are shown as being coupled to receiver 104 via local area network (LAN) 130. The coupling between nodes 114 and 116 and receiver 104 can be direct (e.g., via a wire, fiber optic cable, wireless connection, or some other communications medium) or indirect (e.g., via a L2 network device or another node, such as a customer edge (CE) node). Nodes 114 and 116 are also coupled to each other via a tunnel 120. Tunnel 120 can be implemented according to any available tunneling mechanism. For example, tunnel 120 can be implemented using a point-to-point label switched path (LSP), a generic routing encapsulation (GRE) tunnel, a source routing (SR) tunnel, or any other available tunneling mechanism. Tunnel 120, in one embodiment, traverses a portion of core network 150 and can include one or more intervening nodes. In another embodiment, tunnel 120 is implemented as a direct link between node 114 and node 116.

Source 102 is a host configured to transmit packets, e.g., multicast data packets, to one or more receivers, e.g., subscribers to one or more multicast groups. Source 102 transmits a multicast flow, consisting of one or more multicast data packets having a common multicast group address, to node 112. Node 112 includes forwarding information, such as a multicast forwarding table, that node 112 uses to determine where, e.g., out of which interface(s) to forward the multicast data packets associated with the multicast flow. For example, node 112 can determine that both node 114 and node 116 have sent join requests for a particular multicast group. Using forwarding information, such as a multicast forwarding table, node 112 determines that both node 114 and 116 are reachable via interface 2. In response to receiving, e.g., from source 102, multicast data packets addressed to the particular multicast group, node 112 forwards the multicast data packets out interface 2.

Receiver 104 is configured to receive multicast data packets after joining one or more multicast groups. For example, receiver 104 can transmit join information, such as an IGMP report or MLD report, which identifies a multicast group to which receiver 104 wishes to subscribe. In the example of FIG. 1, receiver 104 transmits the join information onto LAN 130. In one embodiment, LAN 130 and the devices connected thereto form a leaf network. Leaf networks couple provider equipment to customer equipment, unlike transit networks, which couple provider equipment to other provider equipment.

Nodes 114 and 116 receive the join information from receiver 104 and inform node 112 that they are coupled to one or more receivers that wish to subscribe to a multicast group associated with a source to which node 112 is coupled by forwarding the join information towards node 112 using, for example, protocol independent multicast (PIM) join messages. In response to receiving the join messages, node 112 updates its multicast forwarding information to identify interfaces to which multicast data packets should be forwarded in order to reach receiver 104. The multicast data packets can be replicated by node 112 and/or by nodes in core network 150 as needed in order to provide the multicast data packets to receivers for the multicast group (e.g., receiver 104). In this manner, a multicast flow from source 102 can be transmitted through a multicast network to one or more receivers.

Nodes can discover redundancy and select a primary forwarder and a secondary forwarder. This helps to prevent delivery of redundant packets to receivers. Redundancy can include, for example, multiple nodes in a single leaf network, multiple nodes coupled to a single LAN segment, multiple nodes coupled to a single RP, or any other configuration that would result, if not ameliorated, in duplicate copies of packets being delivered to one or more receivers.

Detection of redundancy can be performed in various ways. For example, in networks that implement PIM, nodes exchange state information with their neighbors. The state information is included in PIM-Hello messages. The information in the PIM-Hello messages is used by the nodes to discover redundancy. Nodes can also, or in the alternative, use information in Interior Gateway Protocol (IGP) messages (such as IS-IS (Intermediate System to Intermediate System) and OSPF (Open Shortest Path First)) and/or information in Border Gateway Protocol (BGP) messages to detect redundant nodes. Detecting redundancy involves detecting how many connections to a particular network entity, such as a LAN, exist and also, in some cases, which nodes are connected to the particular network entity.

In response to detecting redundant nodes, the nodes select one of the redundant nodes to forward information, such as multicast data packets and/or control information, on behalf of the redundant nodes. Those nodes not elected rely on the elected node to perform the forwarding tasks. In one embodiment, the nodes elect a DF and BDF. Election of a DF can be based on, for example, router priority, router identifier, IP address, shortest distance to a rendezvous point (RP), or some combination of these and/or other factors. In the example of FIG. 1, node 114 and node 116 exchange PIM-Hello messages. Based upon information in the PIM-Hello messages, node 114 is elected DF and node 116 is elected BDF.

In conjunction with the DF election process, node 114 and node 116 establish tunnel 120 between node 114 and node 116. Establishing a tunnel involves exchanging tunnel endpoint information, such as a label with which packets sent via the tunnel should be encapsulated, and/or information identifying an interface corresponding to the tunnel. Node 114 and node 116 can include the tunnel endpoint information in the PIM-Hello messages they exchange, or can exchange additional messages to exchange the tunnel endpoint information. Tunnel 120 can be used to forward traffic to or from receiver 104 in the event that the DF loses connectivity to LAN 130 as discussed with regard to FIG. 2.

As shown in FIG. 1, both node 114 and node 116 receive traffic (e.g., multicast data packets addressed to a group that receiver 104 has joined) from core network 150. Both node 114 and node 116 would forward the received traffic onto LAN 130, resulting in duplicate packets being received by receiver 104. However, since node 116 is configured as the BDF, node 116 does not forward the traffic onto LAN 130. Instead, node 116 drops the traffic. That is, forwarding information on node 116 is configured such that traffic received on an interface coupled to core network 150 (interface 1 in this example) by node 116 is dropped.

Node 114 is configured as the DF. Therefore, in response to receiving traffic from core network 150 (interface 1 in this example), node 114 forwards the traffic onto the LAN. Traffic forwarded onto the LAN is received by receiver 104. Node 114 is configured to detect any loss of connectivity to LAN 130. Such loss of connectivity can include a link failure, or a failure of one or more intervening network devices (not shown). Node 114 is configured to, in response to detecting a loss of connectivity to the LAN, begin forwarding traffic received via interface 1 and destined for the LAN to tunnel 120. Node 116 is configured to forward any traffic received via tunnel 120 onto LAN 130.

Figure 2:
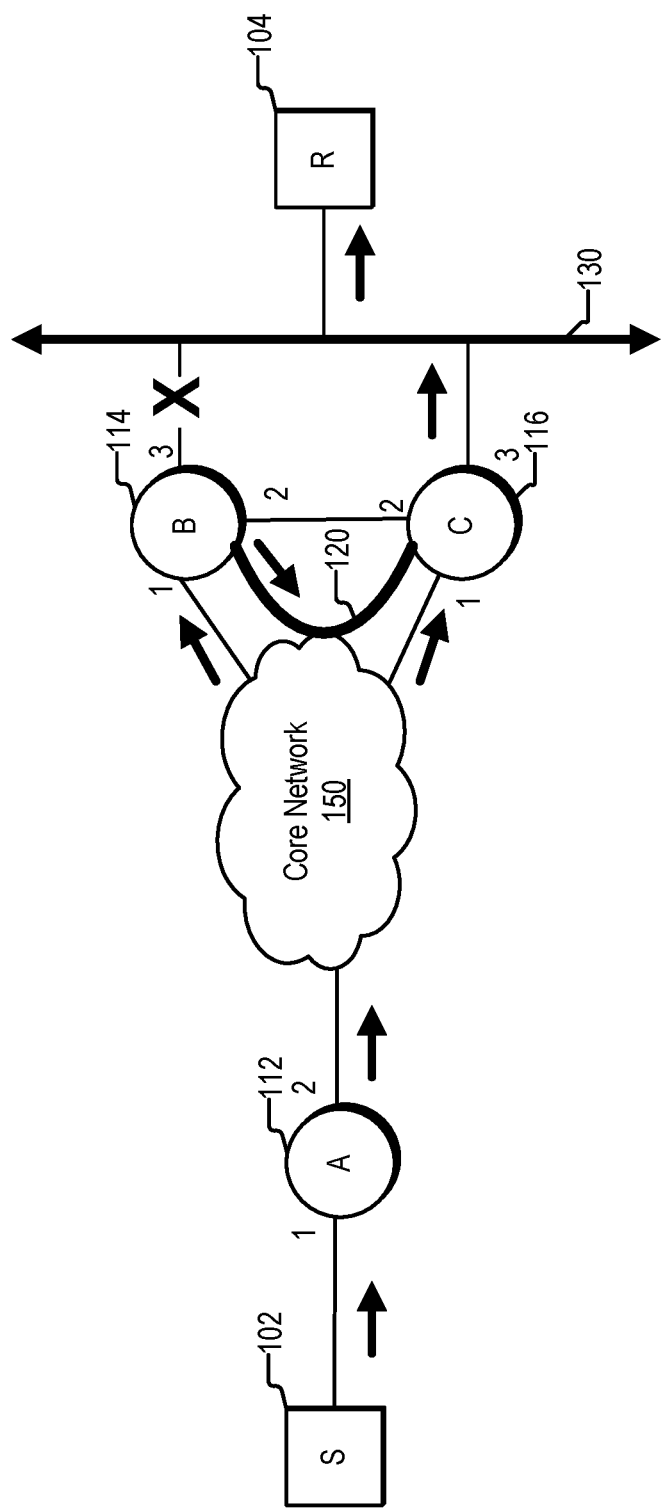
FIG. 2 is a simplified block diagram illustrating certain components of an example network.

FIG. 2 is a simplified block diagram illustrating certain components of an example network. Many of the elements shown in FIG. 2 correspond to those shown in FIG. 1, and like elements have like numbering. As shown in FIG. 2, node 114 has lost connectivity to LAN 130. In this example, node 114 has been elected as the DF. The loss of connectivity can be due to a hardware or software failure on node 114, one or more entities coupled to node 114, or communication media coupling node 114 to LAN 130.

Node 114 can detect this loss of connectivity in any of several ways, including failure to receive expected communications (such as acknowledgement or hello messages), in response to traffic being bounced, or as a result of a diagnostic process run by node 114. In one embodiment, a loss of connectivity is indicated by the time taken to transmit packets to receiver 104 exceeding a specified threshold. In response to detecting the loss of connectivity, node 114 begins forwarding traffic destined for LAN 130 to tunnel 120. As can be seen, though node 114 has lost connectivity to the LAN, node 114 is not completely failed. For example, node 114 is still able to detect the loss of connectivity and forward traffic to an alternate interface, such as the interface with which tunnel 120 is associated.

Traffic forwarded by node 114 via tunnel 120 is received by node 116. In this example, node 114 has been elected as the BDF. In response to receiving traffic via tunnel 120, the BDF forwards the traffic onto LAN 130. In one embodiment, in response to receiving traffic via 120, the BDF begins forwarding traffic received via interface 1, and discards the traffic received via the tunnel. In this implementation, the BDF updates forwarding information, such as a forwarding table, to indicate that traffic received via interface 1, which was previously dropped, now should be forwarded to LAN 130. Also in response to receiving traffic via tunnel 120, node 116 initiates a DF election process to select a new DF. In one embodiment, the BDF begins acting as DF in response to receiving traffic via tunnel 120.

While the current description primarily refers to multicast protocols and multicast data packets, it is noted that the concepts described herein are applicable to network protocols and traffic other than multicast. Where terms such as multicast-enabled nodes are used, it is understood that in certain embodiments, the nodes need not implement multicast. For example, a node as described herein may be a node configured to implement Ethernet Virtual Private Networking (EVPN) in addition to or instead of multicast and the multicast data packets may be simply data packets, e.g., packets that do not include multicast information. The present description is applicable to any type of multi-destination traffic, such as broadcast traffic, unknown unicast traffic, and multicast traffic.

Figure 3A:
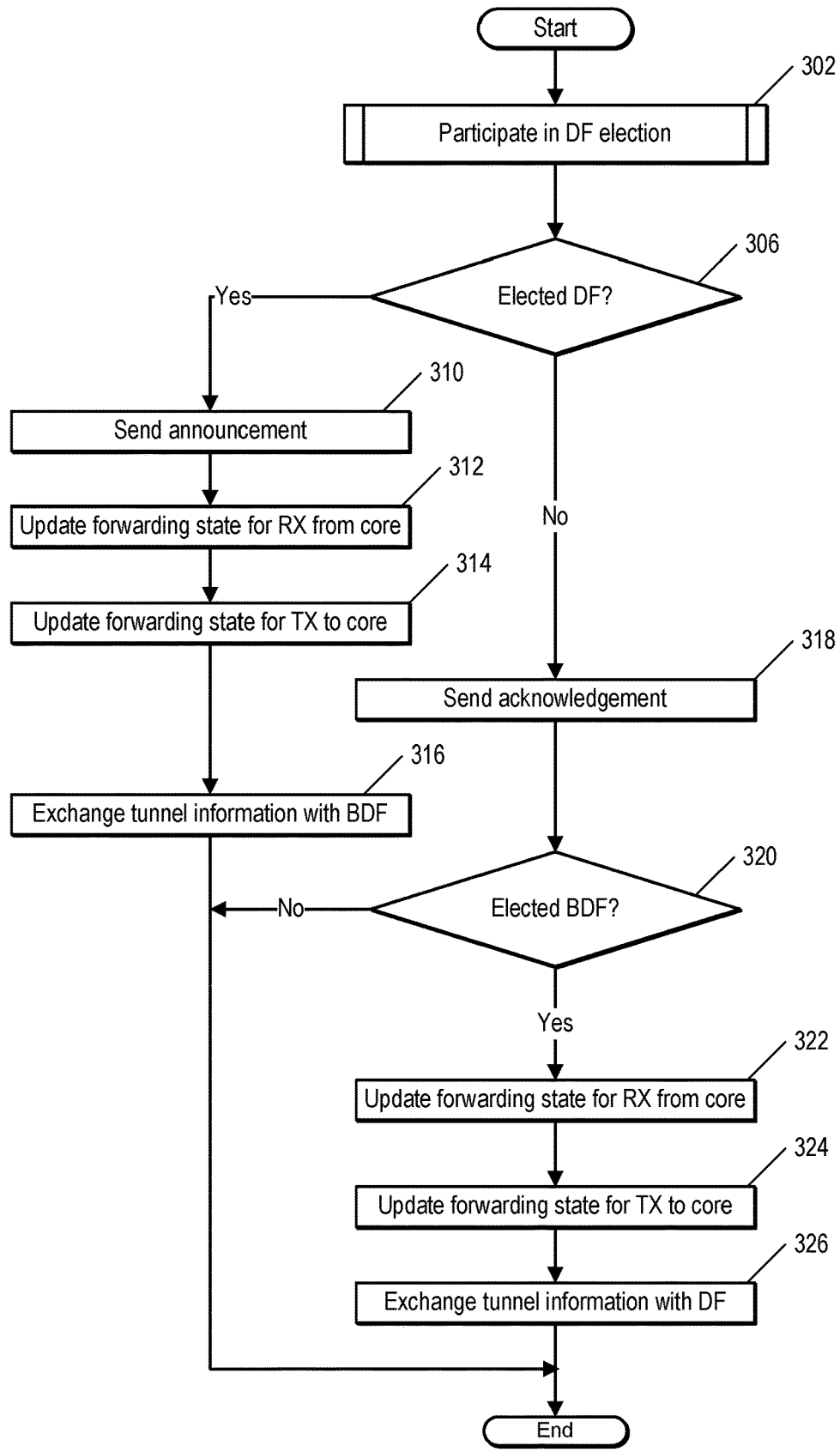
FIG. 3A is a flow chart illustrating an example process, according to the present description.

FIG. 3A shows an example method of configuring a node, such as one of nodes 114 and 116 of FIG. 1. In one embodiment, the method of FIG. 3A is performed by each node coupled to a LAN, such as LAN 130 of FIG. 1. In other embodiment, the method is performed by nodes in a leaf network, nodes coupled to a LAN or LAN segment, nodes within an area of an autonomous system, nodes along a particular route, or nodes included in any other portion of a network that is configured to provide traffic to one or more receivers and in which one or more redundant nodes can exist.

The node participates in an election, such as a DF election, at 302. Additional details of participating in an election are discussed with regard to FIG. 3B. Though described in terms of a DF election, the election described covers any process that specifies one or more node(s) that forward information, such as data and/or control information, and one or more node(s) that do not. For example, the description covers election of a designated router (DR) and backup designated router (BDR), selection of an active node and standby node, selection of a primary and backup element, and the like.

At 306, the node determines whether it has been elected DF. As discussed below, this involves comparing one or more election values with the election values of one or more other nodes. If the node has been elected DF, the node notifies, at 310, one or more other nodes of its election as DF. In one embodiment, the node also designates a BDF, and notifies the BDF of its election as BDF. In the example of FIG. 1, node 114 is elected DF and sends an announcement to node 116 indicating that node 114 is the BDF for LAN 130, and node 116 is the BDF.

At 312, the node updates forwarding state information for receiving multicast traffic from a core network, such as core network 150 of FIG. 1. For example, the node updates a forwarding table indicating how traffic received from the core network should be handled, e.g., forwarded to the LAN or tunnel, or dropped. Additional details regarding operations performed by a DF are described with regard to FIG. 5A.

At 314, the node updates forwarding state for transmitting multicast traffic to the core network. For example, the node updates a forwarding table indicating how multicast traffic received from sources coupled to a LAN, such as LAN 130 of FIG. 1, should be handled. At 316, the node exchanges tunnel information with a BDF. In one embodiment, this involves sending a message including a label corresponding to a tunnel between the DF and BDF. This also involves receiving a corresponding message from the BDF. In one embodiment, the node includes the tunnel information in the PIM-Hello messages exchanged with the BDF. If there is an existing tunnel from before the election, and the DF and BDF are not identical as before, the tunnel between the previous DF and BDF is torn down.

If the node determines at 306, that the node has not been elected DF, the node sends an acknowledgement message, at 318, to the DF, e.g., in response to receiving an announcement message from the DF. In one embodiment, the DF waits until it detects that acknowledgement messages have been received from all nodes before the DF begins forwarding packets to the receivers. In another embodiment, the DF does not wait for acknowledgment messages and begins forwarding to the receivers in response to being elected DF. The node then determines, at 320, whether the node was elected BDF. In one embodiment, determining that the node is elected BDF involves receiving a message from the DF indicating that the node is the BDF. In another embodiment, the node determines it has been elected BDF by comparing one or more election values with the election values of one or more other nodes, as discussed below. In response to detecting that the node was elected BDF, the node updates, at 322, forwarding state information for receiving multicast traffic from the core. For example, the node updates a forwarding table indicating how such traffic should be forwarded. Additional details regarding forwarding state for a BDF are described with regard to FIG. 4A. At 324, the node updates forwarding state for transmitting multicast traffic to the core network. For example, the node updates a forwarding table indicating how multicast traffic received from sources coupled to a LAN, such as LAN 130 of FIG. 1, should be handled.

The node exchanges, at 326, tunnel information with a DF. As described above, this involves receiving message from the DF that includes information identifying a tunnel, and sending a message to the DF with corresponding information identified in the tunnel.

Figure 3B:
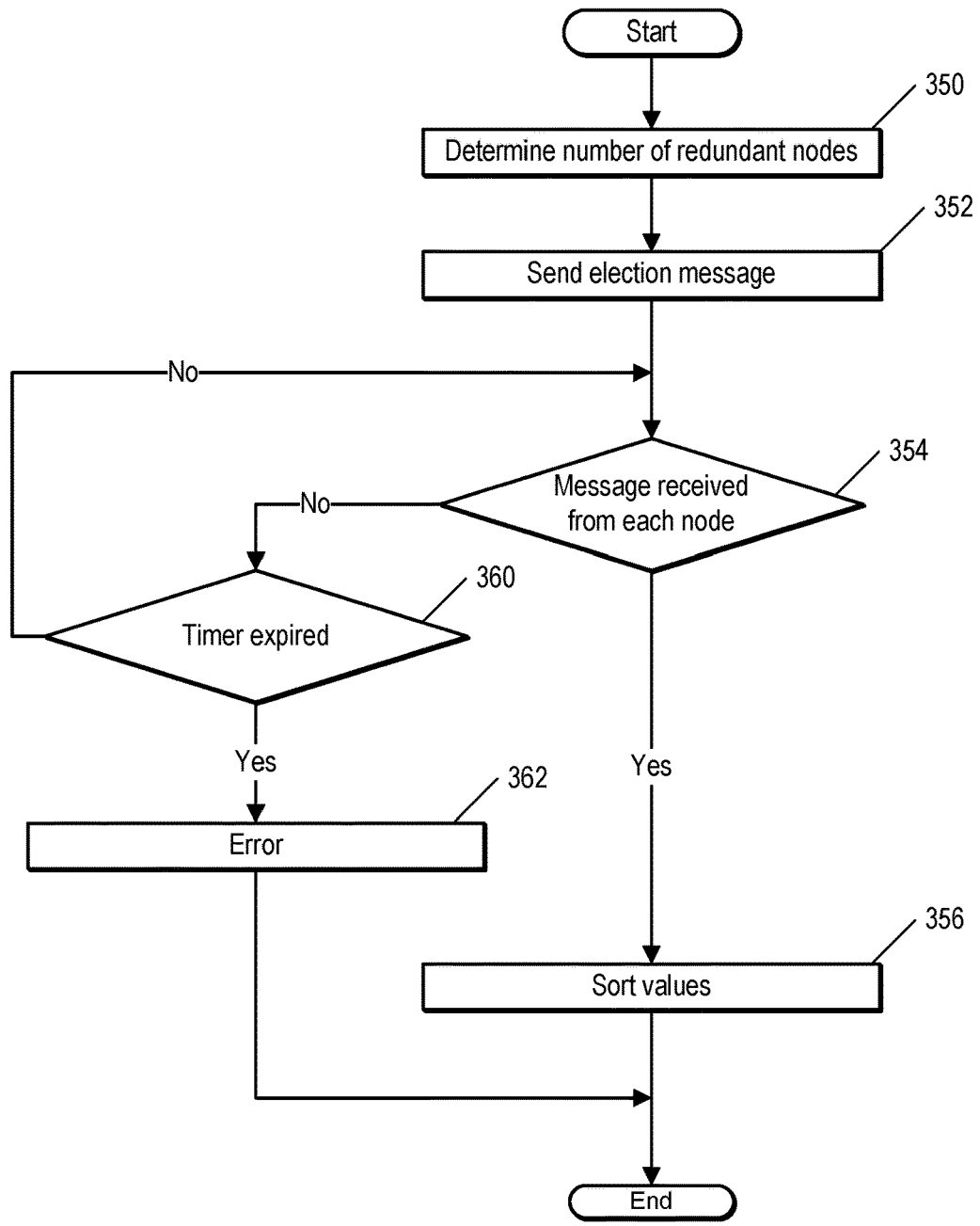
FIG. 3B is a flow chart illustrating an example process, according to the present description.

FIG. 3B shows an example method of performing an election, such as a DF election. In one embodiment, the method is performed by nodes in a leaf network, such as nodes 114 and 116 of FIG. 1. Participating in an election, as described herein, involves exchanging one or more messages that include information used to select a primary forwarder and a secondary forwarder, such as a DF and BDF. In one embodiment, performing the election involves redundant nodes exchanging messages, such as PIM-Hello messages, with one or more other nodes, such as neighbor nodes. Based on information in the messages, a node is able to determine whether the node has been elected DF or BDF. DF election involves each node independently and unambiguously selecting the same node as DF. That is, there should be unanimous agreement among all the nodes regarding which node is the DF.

In one embodiment, a node determines, at 350, how many nodes will participate in the election. For example, the node can determine how many exist in the leaf network, or how many nodes are coupled to a LAN, such as LAN 130 of FIG. 1. In one embodiment, this involves exchanging messages, such as PIM-Hello messages with neighbor nodes. The messages include, in one embodiment, an election value. In another embodiment, the node sends election values to one or more other nodes in separate messages at 352. At 354, the node determines whether a message that includes an election value has been received from each of the nodes. If not, the node determines, at 360, whether a predetermined amount of time has expired. If so, the node generates an error at 362. Otherwise, the node sorts the values at 356. For example, if the values are numerical values, such as router identifiers, IP addresses, router priority values, or the like, the node orders the values from highest to lowest and selects the node having the highest value as the DF and the node having the second highest value as the BDF. If the values are numerical values representing hop-count, distance to a specified node, or some other routing metric, the node orders the values from lowest to highest and selects the node having the lowest value as the DF and the node having the second lowest value as the BDF. Any type of value that that differentiates between the nodes and which will be unanimously agreed upon by the nodes can be used for DF and BDF selection.

Figures 4A, 4B:
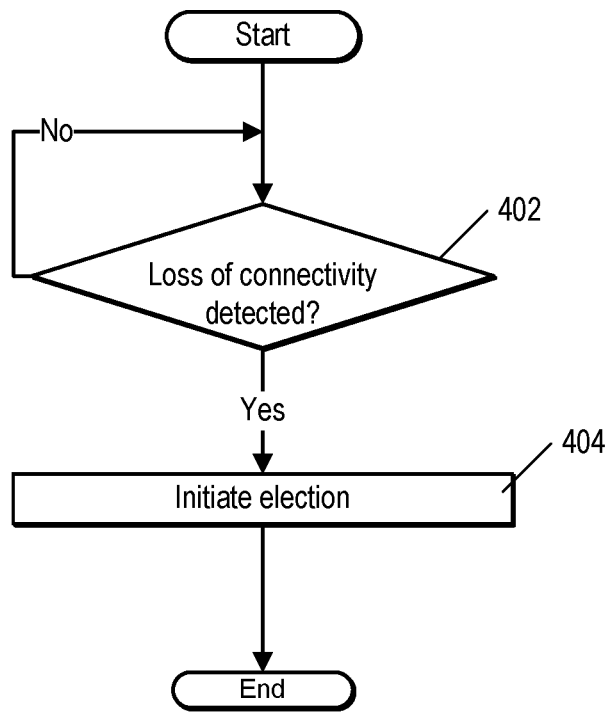
FIG. 4A is a flow chart illustrating an example process, according to the present description.
FIG. 4B is an example table, according to the present description.

FIG. 4A illustrates a method performed by a node that has been selected as BDF, such as node 116 of FIG. 1. At 402, the BDF determines whether a loss of connectivity on the part of the DF has been detected. In one embodiment, the DF is a node, such as node 114 of FIG. 1, that has been elected DF by a process involving the exchange of control messages, such as PIM-Hello messages. In order to detect a loss of connectivity, the BDF, in one embodiment, detects receipt of a packet via a tunnel, such as tunnel 120 of FIG. 1, between the BDF and the DF. Receiving packets on tunnel 120 from the DF indicates that the DF has determined that the DF can no longer communicate with a LAN, such as LAN 130 of FIG. 1. Therefore, if the BDF receives a packet from the DF via the tunnel, the BDF can conclude that the DF is experiencing a loss of connectivity to a LAN. In one embodiment, detecting that the DF has lost connectivity to the LAN is performed using control messages, such as PIM protocol messages. For example, the BDF can be configured to expect to periodically receive PIM-Hello messages from the DF via the LAN. In response to determining that the BDF has not received an expected PIM-Hello message from the DF, e.g., via the LAN, in a certain period of time, the BDF can conclude that the DF is no longer communicatively coupled to the LAN.

At 404, in response to detecting the loss of connectivity to the LAN of the DF, the BDF initiates an election process to elect a new DF. In one embodiment, this involves transmitting control messages, such as PIM-Hello messages, to any nodes connected to the LAN.

FIG. 4B shows an example forwarding table maintained by a node that has been selected as BDF, such as node 116 of FIG. 1. Forwarding table 450 indicates what action to take for packets, based upon where the packets were received from. In one embodiment, forwarding table 450 applies only to packets associated with a specific multicast group. That is, the node only uses forwarding table 450 to forward those packets having a specific multicast identified in the packet. In response to receiving a packet, the node looks up a destination address, such as multicast group, in the packet. If the destination matches a destination associated with forwarding table 450, the node performs the action indicated by forwarding table 450 for the packet, based on where the packet was received from. For example, forwarding table 450 shows that if the BDF receives traffic on an incoming interface coupled to a core network, such as core network 150 of FIG. 1, the node should drop the traffic. Forwarding table 450 also shows that if the node receives multicast traffic on an interface coupled to a tunnel, such as tunnel 120 of FIG. 1, the node should forward the traffic to the LAN. Forwarding table 450 also shows that if the node receives traffic from the LAN, the traffic should be forwarded to the DF via the tunnel. Traffic received from the LAN should not be forwarded to the core network by the node acting as BDF. While forwarding table is shown using informal terms to identify locations, e.g., "core" and "LAN," any other information that identifies the corresponding entities, or paths thereto, such as interface numbers or label identifiers, can be used in forwarding table 450.

Figures 5A, 5B, 5C:
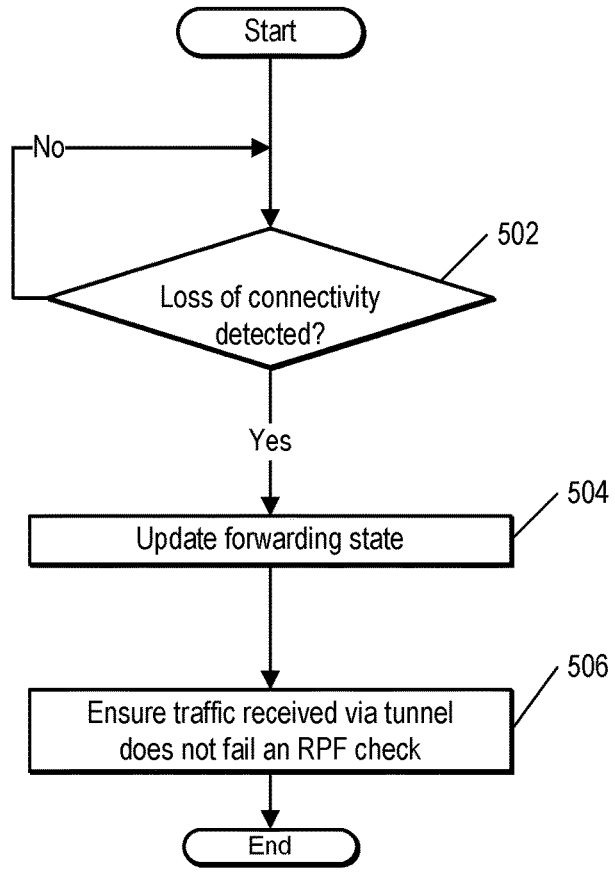
FIG. 5A is a flow chart illustrating an example process, according to the present description.
FIG. 5B is an example table, according to the present description.
FIG. 5C is an example table, according to the present description.

FIG. 5A is a flow chart illustrating an example process, according to the present description. FIG. 5A is performed by a node that has been selected as DF, such as node 114 of FIG. 1. At 502, the DF determines whether or not a loss of connectivity to one or more receivers, e.g., receiver 104 of FIG. 1, or to a network to which the receiver(s) are coupled, e.g., LAN 130 of FIG. 1, is detected. In one embodiment, the DF detects that it is no longer communicatively coupled to the receiver by noting a failure to receive an acknowledgment message. For example, the DF can be configured to expect a response to a control message or a data packet, or to expect control messages on a periodic basis. Failure to timely receive such a message can indicate that there is a failure, either with the DF, the network, or the receiver, that is preventing the normal flow of traffic.

At 504, in response to detecting that the DF is not connected to the LAN, the DF updates forwarding state information maintained by the DF, such as forwarding table information as shown in FIGS. 5B and 5C. For example, in response to detecting a loss of connectivity to the LAN, the DF updates forwarding information such that instead of forwarding traffic received from the core network to the LAN, the DF forwards the traffic to a tunnel, such as tunnel 120 of FIG. 1, coupling the DF to a BDF, such as node 116 of FIG. 1. The DF also updates the forwarding information such that instead of dropping traffic received from the tunnel, the DF forwards the traffic received from the tunnel to the core network.

Figure 6:
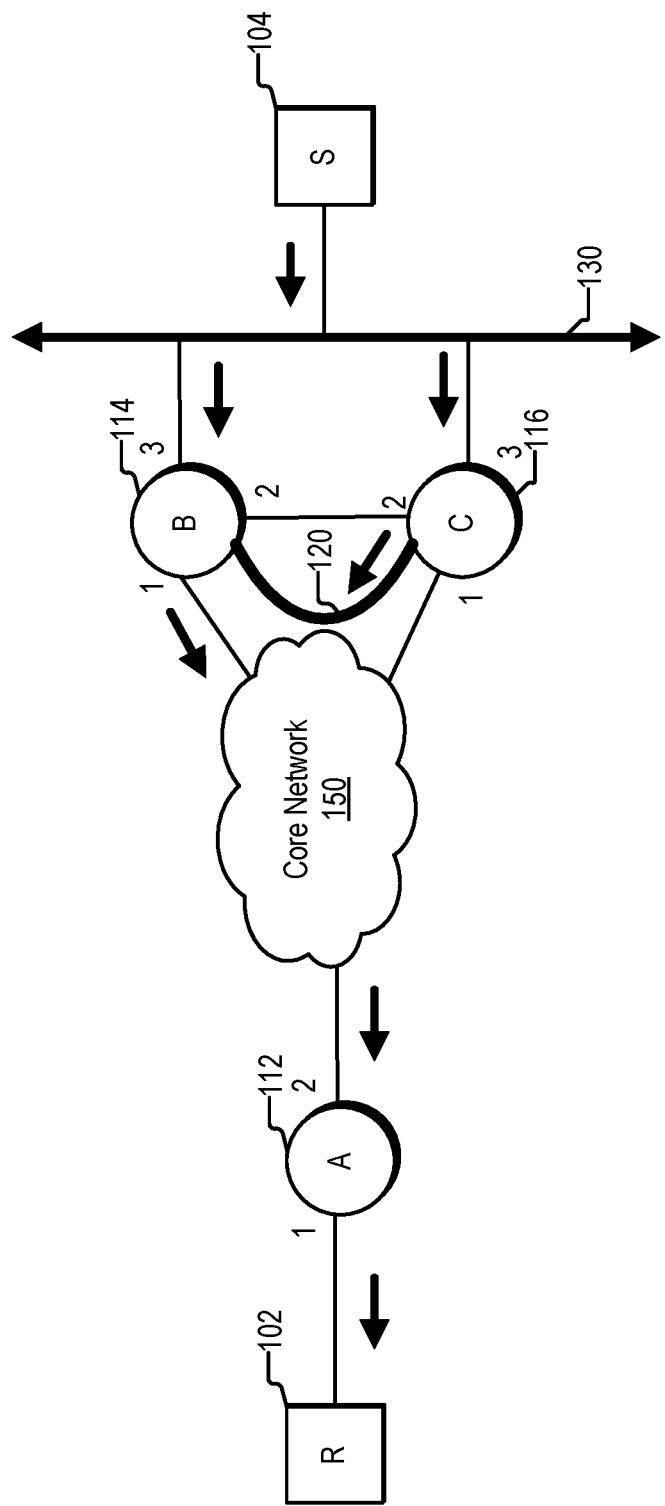
FIG. 6 is a simplified block diagram illustrating certain components of an example network.
Figure 7:
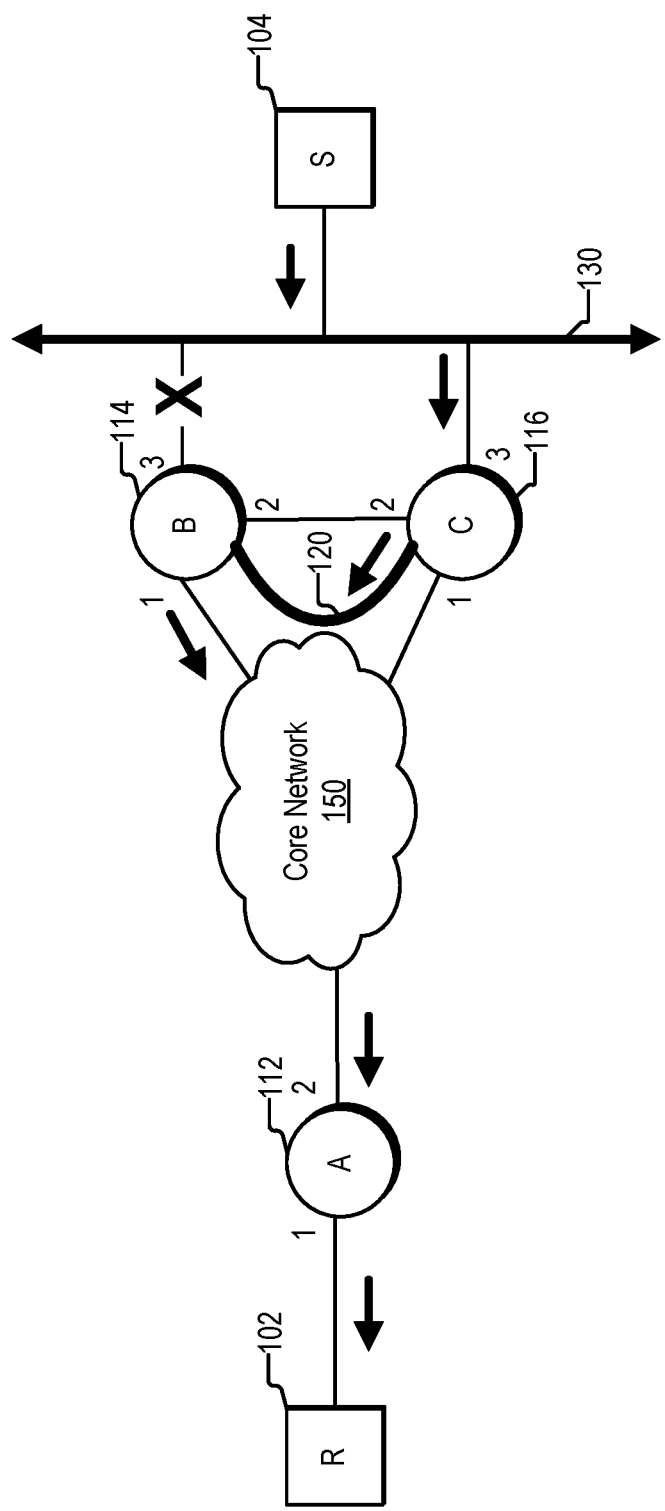
FIG. 7 is a simplified block diagram illustrating certain components of an example network.

At 506, the DF ensures that traffic received via the tunnel does not fail a reverse path forwarding (RPF) check. While the DF and BDF are both connected to the LAN, the DF receives traffic from the LAN and forwards the traffic from the LAN to the core network, as shown in FIGS. 6 and 7. That is, the DF receives a packet from the LAN, performs an RPF check on the packet, and if the packet passes the RPF check, forwards the packet to the core network. The BDF forwards all traffic received from the LAN to the DF via the tunnel, but the DF drops all traffic received from the tunnel while the DF is connected to the LAN. However, after the DF loses connectivity to the LAN, the DF begins forwarding packets received via the tunnel to the core network. That is, packets received by the BDF from the LAN and forwarded from the BDF to the DF are forwarded by the DF to the core network. However, if the DF performs an RPF check on the packets received from the tunnel, the packets would fail the RPF check, since the DF is not configured to forward packets received via the interface associated with the tunnel.

There are multiple ways to ensure that traffic received at the DF from the tunnel (e.g., traffic from the LAN, headed to the core network) is not dropped. In one embodiment, in response to detecting a loss of connectivity, the DF begins spoofing traffic received via the tunnel. That is, the DF determines the destination address of packets received via the tunnel. In response to determining that the destination address indicates that the packets are to be forwarded to the core network, the DF forwards the packets to the core network. However, prior to doing so, the DF modifies the packet headers to indicate that the packets were received by the DF from the DF's interface coupled to the LAN, rather than from the DF's interface coupled to the tunnel. In one embodiment, the packet headers are updated by the DF after receipt to include information that indicates at what interface the packets were received, e.g., the interface coupled to or associated with the tunnel. The information can include an interface identifier, or the like. The DF rewrites this information to indicate (falsely) that the packets were received via an interface associated with the LAN. This prevents the packets from being dropped as coming from unapproved or unexpected sources, or requiring an update (re-convergence) of RPF information. In another embodiment, the DF updates forwarding and/or routing information such that packets received from the tunnel pass an RPF check. This involves updating the RPF interface in a routing table. Updating the RPF interface in a routing table to identify an interface associated with the tunnel ensures that packets received via the tunnel will not fail an RPF check. In another embodiment, the BDF performs the RPF check and encapsulates traffic received from the LAN with a multicast header, such as a BIER header, prior to transmitting the traffic to the tunnel. In this embodiment, the DF determines that no RPF check should be performed, and instead forwards the traffic received from the tunnel to the core network as is.

FIG. 5B is an example forwarding table maintained by a node that has been selected as DF, such as node 114 of FIG. 1. Forwarding table 550 shows forwarding state information prior to the node detecting a loss of connectivity to one or more receivers, e.g., receiver 104 of FIG. 1, or to a network to which the receiver(s) are coupled, e.g., LAN 130 of FIG. 1. Prior to detecting a loss of connectivity to the LAN, the node forwards packets received from a core network, such as core network 150 of FIG. 1, to the LAN. In response to receiving packets from the LAN, the node forwards the packets received via the LAN to the core network. And in response to receiving packets via a tunnel coupled to a BDF, such as tunnel 120 coupled to node 116 of FIG. 1, the node drops the packets received via the tunnel.

FIG. 5C shows the forwarding table having been updated in response to detecting the node's loss of connectivity to the LAN. Subsequent to the node losing connectivity to the LAN, if the node receives packets from the core network, the node forwards the packets received via the core network to the tunnel. Since the node has lost connectivity to the LAN, no packets are expected to be received from the LAN. However, if the node does receive packets that appear to come from the LAN, the node drops the packets that appear to have come from the LAN. In response to receiving packets from the tunnel, e.g., from the BDF, the node forwards the packets to the core network.

FIG. 6 is a simplified block diagram illustrating certain components of an example network. The elements of FIGS. 6 and 7 are similar to those shown in FIGS. 1 and 2, and like numbering indicates like elements. As shown in FIG. 6, a source 104 forwards traffic onto a LAN. Both node 114 and node 116 have received join state for the traffic. Therefore, both nodes would forward copies of the received traffic into the core network 150. However, node 116 has been elected a BDF. Therefore, node 116 does not forward the traffic received from the LAN into the core network. Instead, node 116 is configured to forward all traffic received from the LAN to the DF via tunnel 120. In this embodiment, node 114 has been elected DF. As a result of having been elected DF, node 114 forwards traffic received via the LAN into the core network. Node 114 drops all traffic received via tunnel 120.

FIG. 7 is a simplified block diagram illustrating certain components of an example network. Many of the elements shown in FIG. 7 correspond to those shown in FIG. 6, and like elements have like numbering. As shown in FIG. 7, node 114 has lost connectivity to LAN 130. In this example, node 114 has been elected as the DF. The loss of connectivity can be due to a hardware or software failure on node 114, one or more entities coupled to node 114, or the communication media coupling node 114 to LAN 130.

Node 114 can detect this loss of connectivity in any of several ways, including failure to receive expected communications (such as acknowledgement or hello messages), in response to traffic being bounced, or as a result of a diagnostic process run by node 114. In response to detecting the loss of connectivity by node 114 to LAN 130, node 114, which has been elected DF, begins forwarding traffic received via tunnel 120 into core network 150. As described above, node 114 ensures that traffic received via tunnel 120 does not fail an RPF check. To prevent the traffic from failing an RPF check, node 114 can perform one or more of the following: 1) spoof the address of such traffic so that the traffic appears to have been received by node 114's interface coupled to LAN 130, rather than from node 114's interface coupled to tunnel 120; 2) node 114 can update its RPF interface to be the interface associated with tunnel 114; and 3) node 114 can detect that traffic received via tunnel 120 has been encapsulated for multicast forwarding (e.g., with a BIER header) and in response to the detecting, node 114 can avoid performing an RPF check on the traffic.

Figure 8:
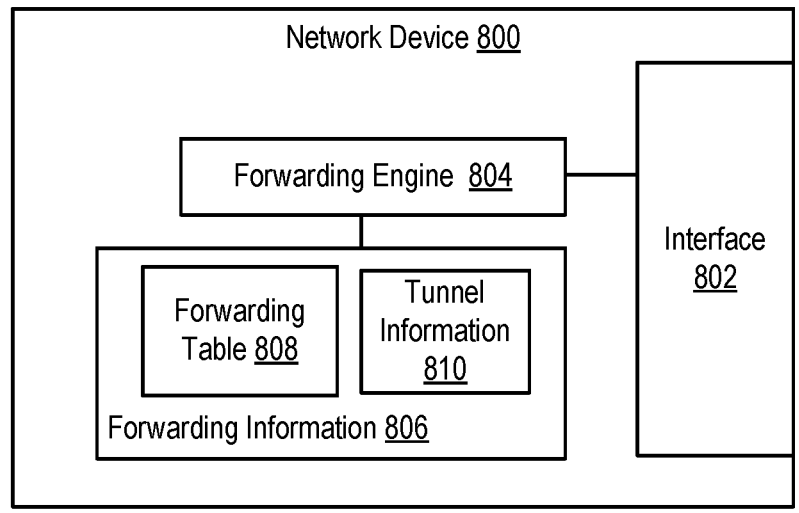
FIG. 8 is a block diagram illustrating certain components of an example node that can be employed in a network.

FIG. 8 is a block diagram illustrating certain components of a network device that can be associated with a node in one of the networks described herein. Network device 800 can, for example, be associated with a node in network 100 of FIG. 1. In the embodiment of FIG. 8, network device 800 includes a forwarding module 804, forwarding information 806 and a communication interface 802. In an embodiment, communication interface 802 comprises multiple interfaces, and is configured both for sending and receiving messages within a network and for sending and receiving control information, either between network nodes or between the network device and a controller. Each interface may be a physical interface or a logical interface.

In the embodiment of FIG. 8, forwarding information 806 includes a FIB, or forwarding table 808. In an embodiment, forwarding table 808 is a multicast forwarding table. In the embodiment of FIG. 8, communication over interface 802 is handled via forwarding module 804. Forwarding module 804 is configured to forward messages using stored forwarding information 806. Forwarding information 806 is used by forwarding module 804.

Figure 9:
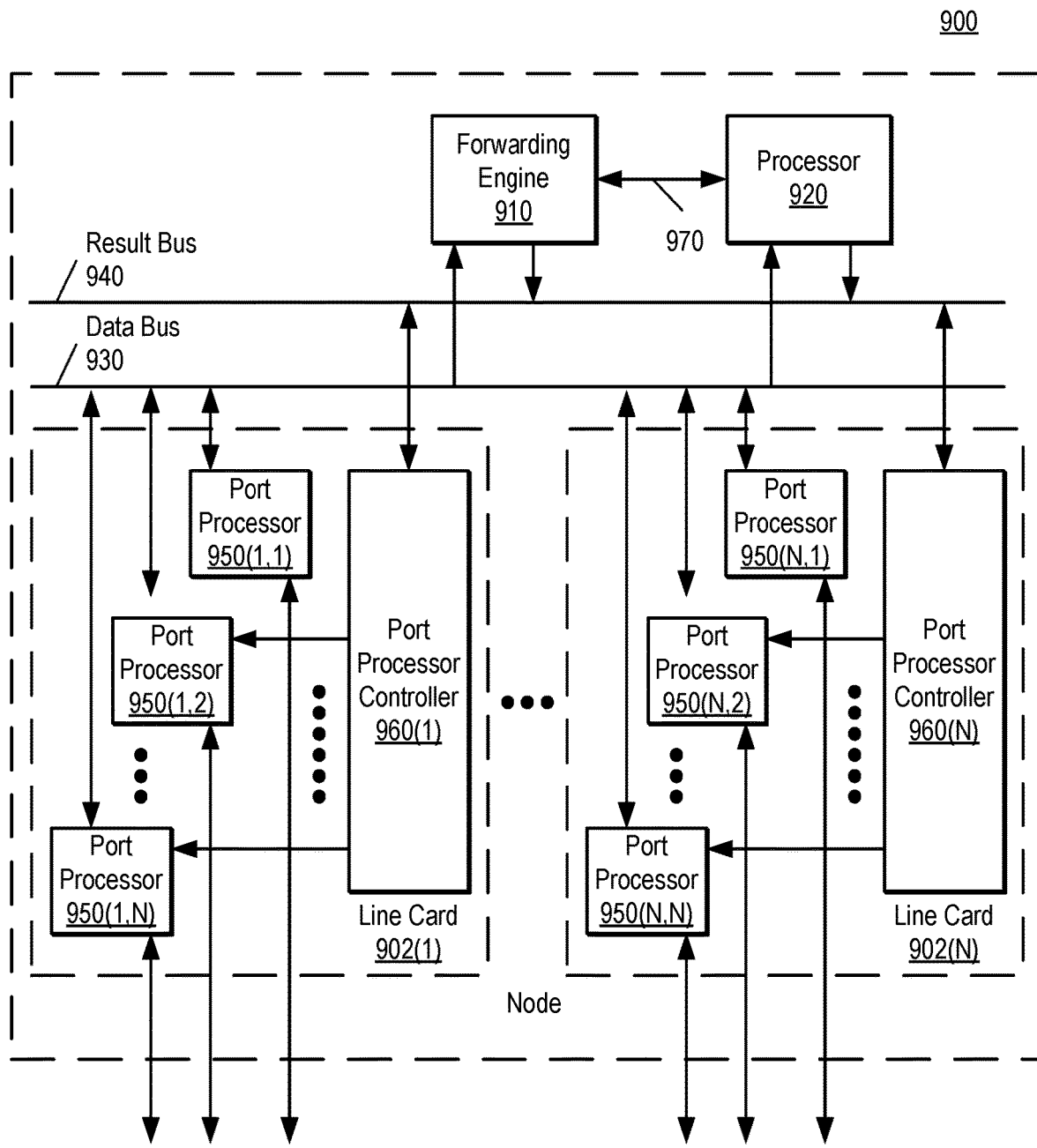
FIG. 9 is a block diagram depicting a computer system suitable for implementing embodiments of the systems described herein.

FIG. 9 is a block diagram illustrating certain additional and/or alternative components of nodes that can be employed in the networks described herein. In this depiction, node 900 includes a number of line cards (line cards 902(1)-(N)) that are communicatively coupled to a forwarding engine or packet forwarder 910 and a processor 920 via a data bus 930 and a result bus 940. Line cards 902(1)-(N) include a number of port processors 950(1, 1)-(N, N) which are controlled by port processor controllers 960(1)-(N). It will also be noted that forwarding engine 910 and processor 920 are not only coupled to one another via data bus 930 and result bus 940, but are also communicatively coupled to one another by a communications link 916.

The processors 950 and 960 of each line card 902 may be mounted on a single printed circuit board. When a packet or packet and header are received, the packet or packet and header may be identified and analyzed by router 900 in the following manner. Upon receipt, a packet (or some or all of its control information) or packet and header is sent from the one of port processors 950(1, 1)-(N, N) at which the packet or packet and header was received to one or more of those devices coupled to data bus 930 (e.g., others of port processors 950(1, 1)-(N, N), forwarding engine 910 and/or processor 920). Handling of the packet or packet and header can be determined, for example, by forwarding engine 910. For example, forwarding engine 910 may determine that the packet or packet and header should be forwarded to one or more of port processors 950(1, 1)-(N, N). This can be accomplished by indicating to corresponding one(s) of port processor controllers 960(1)-(N) that the copy of the packet or packet and header held in the given one(s) of port processors 950(1,1)-(N,N) should be forwarded to the appropriate one of port processors 950(1,1)-(N,N). In addition, or alternatively, once a packet or packet and header has been identified for processing, forwarding engine 910, processor 920 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Figure 10:
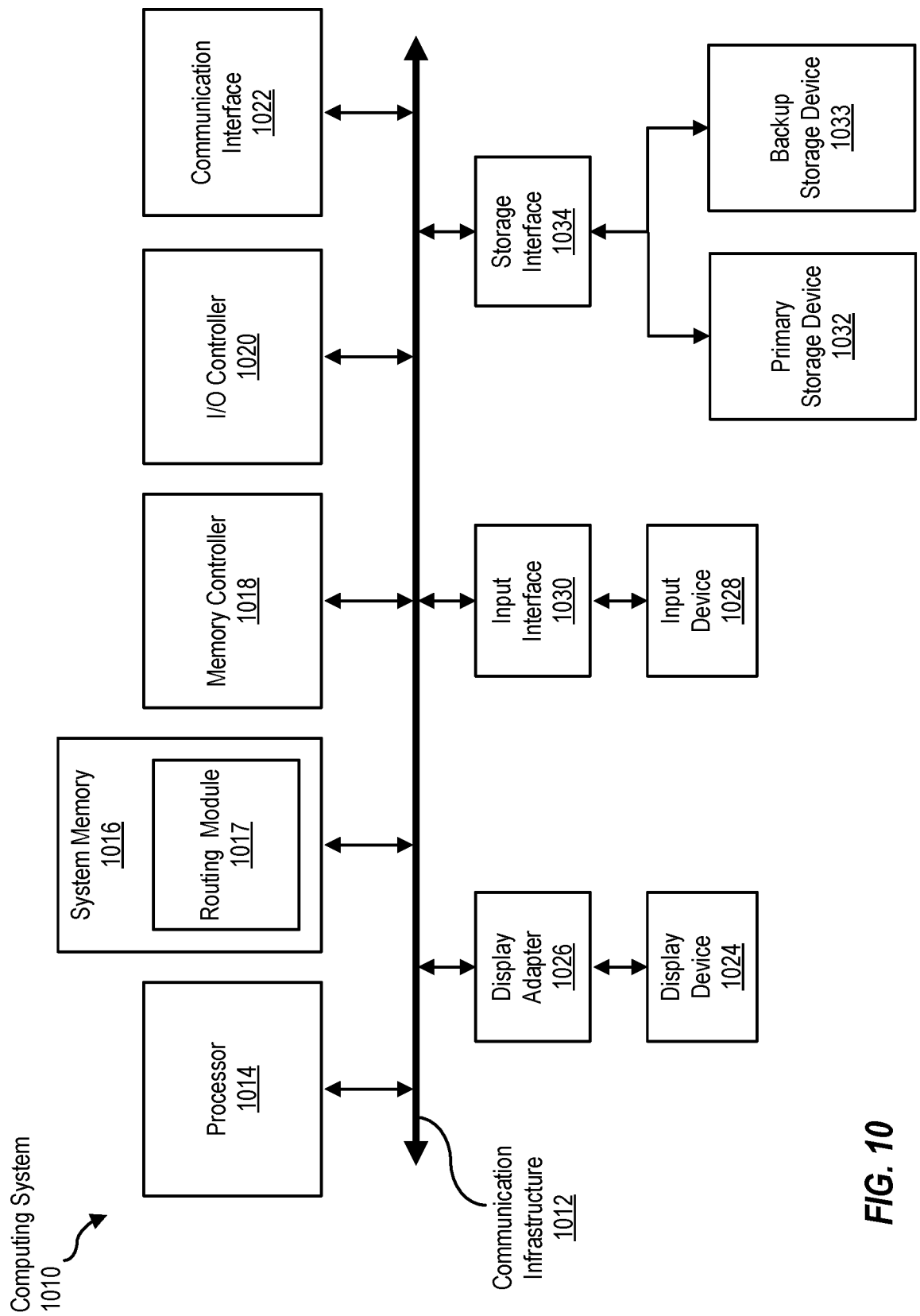
FIG. 10 is a block diagram depicting a network device suitable for implementing embodiments of the systems described herein.

FIG. 10 is a block diagram of a computing device, illustrating, for example, implementation of a forwarding module in software as described above. Computing system 1010 broadly represents any single or multi-processor computing device or system capable of executing computer-readable instructions. Examples of computing system 1010 include, without limitation, any one or more of a variety of devices including workstations, personal computers, laptops, client-side terminals, servers, distributed computing systems, handheld devices (e.g., personal digital assistants and mobile phones), network appliances, switches, routers, storage controllers (e.g., array controllers, tape drive controller, or hard drive controller), and the like. In its most basic configuration, computing system 1010 may include at least one processor 1014 and a system memory 1016. By executing the software that implements a forwarding module 1017, computing system 1010 becomes a special purpose computing device that is configured to perform packet forwarding, in the manner described above.

Processor 1014 generally represents any type or form of processing unit capable of processing data or interpreting and executing instructions. In certain embodiments, processor 1014 may receive instructions from a software application or module. These instructions may cause processor 1014 to perform the functions of one or more of the embodiments described and/or illustrated herein. For example, processor 1014 may perform and/or be a means for performing the operations described herein. Processor 1014 may also perform and/or be a means for performing any other operations, methods, or processes described and/or illustrated herein.

System memory 1016 generally represents any type or form of volatile or non-volatile storage device or medium capable of storing data and/or other computer-readable instructions. Examples of system memory 1016 include, without limitation, random access memory (RAM), read only memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, program instructions executable to implement a forwarding module configured to forward multicast data packets may be loaded into system memory 1016.

In certain embodiments, computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012. In certain embodiments, memory controller 1018 may perform and/or be a means for performing, either alone or in combination with other elements, one or more of the operations or features described and/or illustrated herein.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

Communication interface 1022 broadly represents any type or form of communication device or adapter capable of facilitating communication between computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 10054 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer) for display on display device 1024.

As illustrated in FIG. 10, computing system 1010 may also include at least one input device 1028 coupled to communication infrastructure 1012 via an input interface 1030. Input device 1028 generally represents any type or form of input device capable of providing input, either computer or human generated, to computing system 1010. Examples of input device 1028 include, without limitation, a keyboard, a pointing device, a speech recognition device, or any other input device.

As illustrated in FIG. 10, computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a floppy disk drive, a magnetic tape drive, an optical disk drive, a flash drive, or the like. Storage interface 1034 generally represents any type or form of interface or device for transferring data between storage devices 1032 and 1033 and other components of computing system 1010. A storage device like primary storage device 1032 can store information such as routing tables and forwarding tables.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10.

Computing system 1010 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 1010 for storage in memory via a network such as the Internet or upon a carrier medium.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the embodiments described and/or illustrated herein. Additionally or alternatively, one or more of the embodiments described and/or illustrated herein may be implemented in firmware and/or hardware. For example, computing system 1010 may be configured as an application specific integrated circuit (ASIC) adapted to implement one or more of the embodiments disclosed herein.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting a loss of connectivity between a designated forwarder node and a local network, wherein
        the designated forwarder node is a first node of a plurality of nodes,
        the first node is elected as the designated forwarder node prior to the loss of connectivity,
        a second node of the plurality of nodes is elected as a backup designated forwarder node prior to the loss of connectivity,
        the first node and the second node are communicatively coupled via a tunnel, and
        prior to the loss of connectivity, the designated forwarder node forwards at least a first packet, received from the local network, to a core network; and
    subsequent to detecting the loss of connectivity, forwarding a second packet from the backup designated forwarder node to the core network via the designated forwarder node, wherein
        the second packet is received from the local network by the backup designated forwarder node, and
        the second packet is forwarded from the backup designated forwarder node to the designated forwarder node via the tunnel.

2. The method of claim 1, wherein
the local network is a local area network (LAN), and
the first packet and a second packet are both transmitted toward the designated forwarder node, wherein
    the first packet and the second packet are both transmitted toward the designated forwarder node by the LAN, and
    the second packet is not received by the designated forwarder node.

3. The method of claim 1, further comprising:
electing the second node as the backup designated forwarder node; and
electing the first node as the designated forwarder node.

4. The method of claim 1, further comprising:
prior to the loss of connectivity,
    receiving a copy of the first packet at the backup designated forwarder node, wherein
    the copy of the first packet
forwarding the copy of the first packet to the designated forwarder node, wherein
    the copy of the first packet and the copy of the second packet are both forwarded to the designated forwarder node via the tunnel, and
causing the designated forwarder node to drop the copy of the first packet.

5. The method of claim 1, wherein
the loss of connectivity is detected by the designated forwarder node.

6. The method of claim 3, wherein
another node of the plurality of nodes is configured to perform the electing a first node and the electing a second node.

7. The method of claim 5, wherein
the loss of connectivity is detected by the designated forwarder node as a result of at least one of
    a failure to receive an expected communication from the local network,
    a packet being bounced, or
    a diagnostic process performed by the designated forwarder node.

8. A system comprising:
a designated forwarder node configured to perform a method comprising
detecting a loss of connectivity between the designated forwarder node and a local network, wherein
    the designated forwarder node is a first node of a plurality of nodes,
    the first node is elected as the designated forwarder node prior to the loss of connectivity,
    a second node of the plurality of nodes is elected as a backup designated forwarder node prior to the loss of connectivity,
    the first node and the second node are communicatively coupled via a tunnel, and
    prior to the loss of connectivity, the designated forwarder node forwards at least a first packet, received from the local network, to a core network and subsequent to detecting the loss of connectivity, forwarding a second packet from the backup designated forwarder node to the core network via the designated forwarder node, wherein
the second packet is received from the local network by the backup designated forwarder node, and
the second packet is forwarded from the backup designated forwarder node to the designated forwarder node via the tunnel.

9. The system of claim 8, wherein
the local network is a local area network (LAN), and
the first packet and a second packet are both transmitted toward the designated forwarder node, wherein
the first packet and the second packet are both transmitted toward the designated forwarder node by the LAN, and
the second packet is not received by the designated forwarder node.

10. The system of claim 8, wherein the method further comprises:
electing the second node as the backup designated forwarder node; and
electing the first node as the designated forwarder node.

11. The system of claim 8, wherein the method further comprises:
prior to the loss of connectivity,
receiving a copy of the first packet at the backup designated forwarder node, wherein
the copy of the first packet is received from the local network,
forwarding the copy of the first packet to the designated forwarder node, wherein
the copy of the first packet and the copy of the second packet are both forwarded to the designated forwarder node via the tunnel, and
causing the designated forwarder node to drop the copy of the first packet.

12. The system of claim 8, wherein
the loss of connectivity is detected by the designated forwarder node.

13. The system of claim 10, wherein
another node of the plurality of nodes is configured to perform the electing a first node and the electing a second node.

14. The system of claim 12, wherein
the loss of connectivity is detected by the designated forwarder node as a result of at least one of
a failure to receive an expected communication from the local network,
a packet being bounced, or
a diagnostic process performed by the designated forwarder node.

15. A non-transitory computer readable storage medium comprising program instructions executable to perform a method comprising:
detecting a loss of connectivity between a designated forwarder node and a local network, wherein
the designated forwarder node is a first node of a plurality of nodes,
the first node is elected as the designated forwarder node prior to the loss of connectivity,
a second node of the plurality of nodes is elected as a backup designated forwarder node prior to the loss of connectivity,
the first node and the second node are communicatively coupled via a tunnel, and
prior to the loss of connectivity, the designated forwarder node forwards at least a first packet, received from the local network, to a core network; and
subsequent to detecting the loss of connectivity, forwarding a second packet from the backup designated forwarder node to the core network via the designated forwarder node, wherein
the second packet is received from the local network by the backup designated forwarder node, and
the second packet is forwarded from the backup designated forwarder node to the designated forwarder node via the tunnel.

16. The non-transitory computer readable storage medium of claim 15, wherein
the local network is a local area network (LAN), and
the first packet and a second packet are both transmitted toward the designated forwarder node, wherein
the first packet and the second packet are both transmitted toward the designated forwarder node by the LAN, and
the second packet is not received by the designated forwarder node.

17. The non-transitory computer readable storage medium of claim 15, wherein the method further comprises:
electing the second node as the backup designated forwarder node; and
electing the first node as the designated forwarder node.

18. The non-transitory computer readable storage medium of claim 17, wherein the method further comprises:
prior to the loss of connectivity,
receiving a copy of the first packet at the backup designated forwarder node, wherein
the copy of the first packet is received from the local network,
forwarding the copy of the first packet to the designated forwarder node, wherein
the copy of the first packet and the copy of the second packet are both forwarded to the designated forwarder node via the tunnel, and
causing the designated forwarder node to drop the copy of the first packet.

19. The non-transitory computer readable storage medium of claim 15, wherein
the loss of connectivity is detected by the designated forwarder node.

20. The non-transitory computer readable storage medium of claim 17, wherein
another node of the plurality of nodes is configured to perform the electing a first node and the electing a second node.

* * * * *